United States Patent
Lunel et al.

(10) Patent No.: US 10,190,946 B2
(45) Date of Patent: Jan. 29, 2019

(54) MEASURING COMB FOR MEASURING PARAMETERS OF THE GASES EXITING A TURBOMACHINE WORKING SECTION

(71) Applicant: Safran Aircraft Engines, Paris (FR)

(72) Inventors: Romain Nicolas Lunel, Moissy-Cramayel (FR); Laurent Bernard Cameriano, Moissy-Cramayel (FR); Jeremy Giordan, Moissy-Cramayel (FR); Denis Jean Maurice Sandelis, Moissy-Cramayel (FR); Aurelien Lionel Tedesco, Moissy-Cramayel (FR)

(73) Assignee: SAFRAN AIRCRAFTS ENGINES, Paris (FR)

(*) Notice: Subject to any disclaimer, the term of this patent is extended or adjusted under 35 U.S.C. 154(b) by 80 days.

(21) Appl. No.: 15/314,043

(22) PCT Filed: May 27, 2015

(86) PCT No.: PCT/FR2015/051400
§ 371 (c)(1),
(2) Date: Nov. 25, 2016

(87) PCT Pub. No.: WO2015/181499
PCT Pub. Date: Dec. 3, 2015

(65) Prior Publication Data
US 2017/0191901 A1    Jul. 6, 2017

(30) Foreign Application Priority Data

May 27, 2014 (FR) ..................... 14 54804

(51) Int. Cl.
*G01M 15/14* (2006.01)
*G01M 15/10* (2006.01)
(Continued)

(52) U.S. Cl.
CPC ............. *G01M 15/106* (2013.01); *G01K 1/14* (2013.01); *G01K 13/02* (2013.01); *G01M 15/102* (2013.01); *G01K 2013/024* (2013.01)

(58) Field of Classification Search
USPC ...................................................... 73/112.01
See application file for complete search history.

(56) References Cited

U.S. PATENT DOCUMENTS

| | | | |
|---|---|---|---|
| 4,498,347 A | 2/1985 | Grantham et al. | |
| 6,595,062 B1 | 7/2003 | Luke et al. | |

FOREIGN PATENT DOCUMENTS

| | | |
|---|---|---|
| FR | 2 952 713 A1 | 5/2011 |
| GB | 2 452 026 A | 2/2009 |

OTHER PUBLICATIONS

Search Report dated Mar. 20, 2015 in French Patent Application No. FR 1454804 (with English translation of category of documents).
(Continued)

*Primary Examiner* — Eric S McCall
(74) *Attorney, Agent, or Firm* — Oblon, McClelland, Maier & Neustadt, L.L.P.

(57) ABSTRACT

A measuring comb for temperature and/or pressure and/or chemical composition of the gases flowing at the outlet of a turbine engine flow path, in which the flow path extends around an axis of revolution of the flow path, is provided. The measuring comb includes: a comb body with an elongated shape, intended to face the outlet of the flow path, the comb body including at least one measuring opening arranged along an axis, the measuring opening being configured to tap gases flowing at the outlet of the flow path; and an adjusting system configured to adjust an angle between the axis of the at least one measuring opening and the axis
(Continued)

of revolution, so as to allow orientation of the at least one measuring opening in the flow direction of the gases at the outlet of the flow path.

6 Claims, 5 Drawing Sheets

(51) Int. Cl.
*G01K 1/14* (2006.01)
*G01K 13/02* (2006.01)

(56) References Cited

OTHER PUBLICATIONS

R.W. Ainsworth, et al., "Unsteady pressure measurement", Measurement Science and Technology, vol. 11, No. 7, 2000, XP020062994A, pp. 1055-1076.
International Search Report dated Sep. 11, 2015 in PCT/FR2015/051400 filed May 27, 2015.
Search report for European Patent Application No. 17201775 dated Feb. 22, 2018.

MEASURING COMB FOR MEASURING PARAMETERS OF THE GASES EXITING A TURBOMACHINE WORKING SECTION

GENERAL TECHNICAL FIELD

The present invention relates to a measuring comb for measuring parameters of the gases flowing at the outlet of a turbine engine flow path, such as temperature and/or pressure and/or chemical composition.

PRIOR ART

Measuring combs are known from the prior art configured for measuring parameters of the gases flowing at the outlet of a turbine engine flow path, for example at the outlet of a turbine engine combustion chamber. Such measuring combs are for example described in the Applicant's document FR 2 952 713.

Such measuring combs typically comprise a comb body extending generally along an axis of orientation and including a lower profiled portion intended to be positioned facing the outlet of the combustion chamber and an upper plate designed to be offset relative to the outlet of the combustion chamber so as not to disturb the flow of the gases leaving the combustion chamber. The lower portion is provided with measuring openings connected to measuring instruments through channels. The measuring openings are aligned parallel to the axis of orientation of the comb body and are fixed relative to said comb body.

During the tests carried out on the combustion chamber, the body of the comb is set in rotation around the axis of revolution of the combustion chamber, for example through a rotating ring to which the lower plate of the comb body is clamped. The measuring openings then tap gases flowing through the outlet of the combustion chamber, so as to measure the required parameters, such as pressure and/or temperature at the outlet of the combustion chamber. Such measuring combs thus make it possible to carry out pressure and/or temperature mapping at the outlet of the combustion chamber.

However, at the outlet of the combustion chamber, the gas flow is not necessarily oriented parallel to the axis of the turbine engine. It exhibits three-dimensional effects.

In fact, the combustion chamber can have a tilt relative to the axis of the turbine engine, and consequently induce an inclination in the flow of gas at the outlet of the chamber.

In addition, the use of combustion chambers having a reduced dimension along the axis of the turbine engine and/or not comprising cooling systems such as dilution openings allowing diluted gases to be returned to the axis of the turbine engine, induces a gyration in the gas flow. In other words, the flow of gas leaving the combustion chamber has a tangential component relative to the axis of revolution of said chamber.

However, the measuring combs described below do not make it possible to take into account the inclination or the gyration of the gases flowing through the outlet of the combustion chamber for tapping said gases. Thus it can happen that the measuring combs do not allow enough gas to be tapped at the outlet of the combustion chamber to carry out reliable measurements.

Taking these three-dimensional effects into account is therefore essential.

To cater to this need, the Applicant has considered developing measuring combs having measuring openings tilted relative to the axis of orientation of the comb body.

The applicant noticed, however, when developing such measuring combs, that it was necessary to multiply the width of the comb body by two, to be able to ensure the tilting of the measuring openings with respect to the axis of orientation of the comb body, and thus to take into account the gyratory effect of the gas flow at the outlet of the combustion chamber.

Such a comb body, however, would risk perturbing the flow of gases upstream of the comb body, and thus to falsify measurements carried out by the measuring comb.

Such a solution was therefore not adopted.

PRESENTATION OF THE INVENTION

The present invention has the objective of resolving the aforementioned problems by proposing a measuring comb for measuring the parameters of gases flowing at the outlet of a turbine engine flow path, such as temperature and/or pressure and/or chemical composition, wherein the measuring opening(s) can be oriented in the direction of the gas flow at the outlet of the flow path.

More precisely, the present invention has as its object a measuring comb for temperature and/or pressure and/or chemical composition of the gases flowing at the outlet of a turbine engine flow path, said flow path extending around an axis of revolution of the flow path, said measuring comb comprising a comb body with an elongated shape, intended to face the outlet of the flow path, said comb body comprising at least one measuring opening arranged along an axis, the measuring opening being configured to tap gases flowing at the outlet of the flow path, said measuring comb further being provided with adjusting means configured to adjust an angle between the axis of the measuring opening(s) and the axis of revolution, so as to orient the measuring opening(s) to the flow direction of the gases at the outlet of the flow path.

The measuring openings are advantageously connected to measuring instruments configured for measuring temperature and/or pressure and/or chemical composition of the gases tapped by the measuring openings.

According to a first embodiment, the comb body is a rod forming a rotation line around which the opening(s) are capable of pivoting. The rotation line formed by the rod can be rectilinear or curved.

Preferably, the rod is equipped with a plurality of modules each accommodating a measuring opening, the modules being configured to pivot around the rod independently from each other.

According to a second embodiment, the measuring comb further comprises an arm configured to adjust a tilt of the comb body at the outlet of the flow path with respect to the axis of revolution of the flow path.

Preferably, the measuring comb comprises a plurality of measuring openings the axes whereof extend in the same plane, the arm being configured to adjust a tilt of the comb body at the outlet of the flow path with respect to the axis of revolution of the flow path, so that the plane of the axis of the measuring openings and the axis of revolution form a non-zero angle.

Advantageously, the axes of the measuring openings extend generally in the shape of a fan.

The present invention also has as its object a method for measuring temperature and/or pressure and/or the chemical composition of the gases flowing at the outlet of a generally annular combustion chamber of a turbine engine, said combustion chamber having an axis of revolution, wherein a measuring comb is positioned at the outlet of the combustion chamber so as to tap the gases flowing at the outlet thereof, said measuring comb comprising a plurality of measuring openings the axes whereof extend in the same plane, characterized in that the measuring comb is tilted at the outlet of said chamber, so that the aforementioned plane of the axes of the measuring openings and the axis of revolution form a non-zero angle, and in that the same angle is retained for testing of the combustion chamber under idle and full throttle conditions.

Preferably, gyration of the gas at the outlet of the combustion chamber is calculated under idle and full throttle conditions of the combustion chamber so as to determine a range of gyration of the gas flow at the outlet of the combustion chamber.

More preferably, the measuring openings have a limiting range of detection of the gyration of the gas flow, and wherein the angle is chosen so that the range of gyration of the flow of gas at the outlet of the combustion chamber is included in the limiting detection range of the measuring openings.

Preferably, the measuring comb is tilted at the outlet of the combustion chamber, so that the plane of the axes of the measuring openings and the axis of revolution form an angle comprised between 5 and 15°.

Preferably, the rotation comb is rotated around the axis of revolution.

Preferably, the same angle is retained for testing under idle and full throttle conditions of the combustion chamber.

PRESENTATION OF THE FIGURES

Other features, aims and advantages of the present invention will appear upon reading the detailed description hereafter, and with reference to the appended drawings given by way of non-limiting examples wherein.

DETAILED DESCRIPTION

FIGS. 1 to 3 and 7 to 9 show a measuring comb 10, 30 for measuring parameters of the gases flowing at the outlet of a flow path 1 of a turbine engine having an axis of revolution 2, according respectively to a first and a second embodiment of the invention.

The parameters to be measured are for example temperature and/or pressure and/or the chemical composition of the gases flowing at the outlet of the flow path 1.

Figure 1:
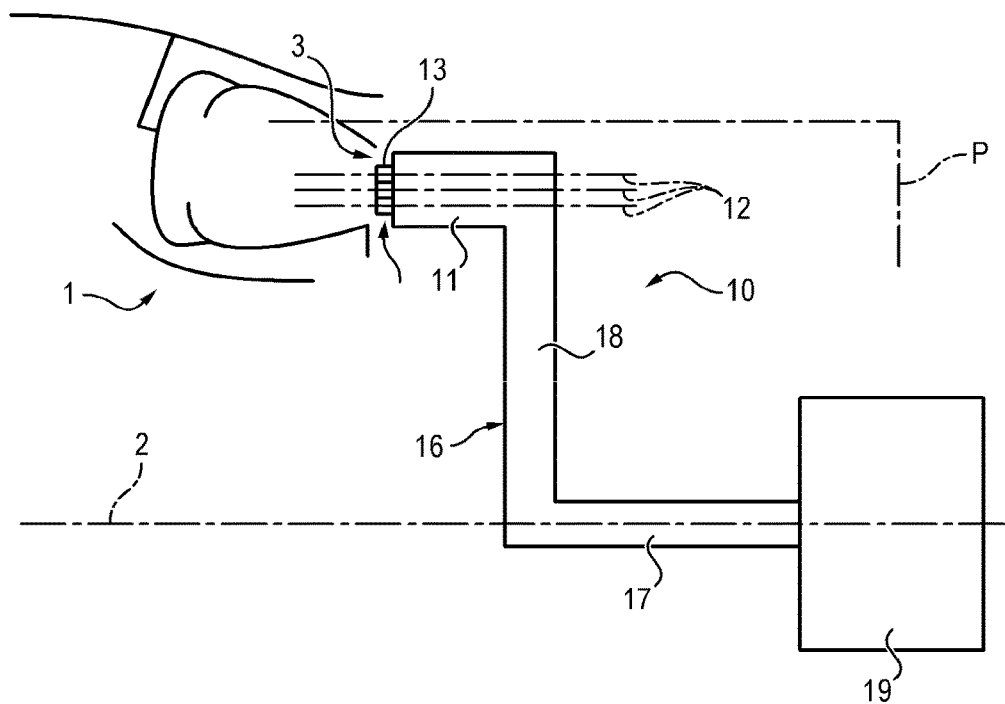
FIG. 1 shows a schematic view of a measuring comb according to a first embodiment of the invention in position for measuring the parameters of the gases flowing at the outlet of a combustion chamber.

The flow path 1 is for example a combustion chamber as illustrated in FIG. 1. As a variant, the flow path 1 can for example be a high or low pressure compressor, a high or low pressure turbine, or an exhaust nozzle. A person skilled in the art will understand that this list is not exhaustive and that the present invention applies to any flow path of a turbine engine.

The measuring comb 10, 30 comprises a comb body 11, 31 with an elongated shape, intended to face the outlet of the flow path 1. The comb body 11, 31 comprises at least one measuring opening 13, 33, arranged along an axis 12, 32. The measuring opening 13, 33 is configured to sample gases flowing at the outlet of the flow path 1.

The measuring comb 10, 30 further comprises adjusting means 16, 36 configured to adjust an angle between the axis 12, 32 of the measuring opening(s) 13, 33 and the axis of revolution 2 so as to orient the measuring opening(s) 13, 33 in the flow direction of the gases at the outlet of the flow path 1.

In this manner, it is possible to orient the measuring openings 13, 33 in the flow direction of the gases at the outlet of the flow path 1, and therefore to take into account their inclination as well as their gyration with respect to the axis of revolution 2. Thus, the openings 13, 33 make it possible to tap a greater quantity of gases at the outlet of the flow path 1 and the measures accomplished are improved as a result.

The measuring openings 13, 33 are further connected to measuring instruments 14, 34 configured for measuring temperature and/or pressure and/or the composition of the gases tapped by the measuring openings 13, 33. The measuring instruments 14, 34 can be configured to accomplish individual measurements, i.e. per measuring opening 13, 33, or averaged over all the measuring openings 13, 33.

First Embodiment of the Invention

Figure 2:
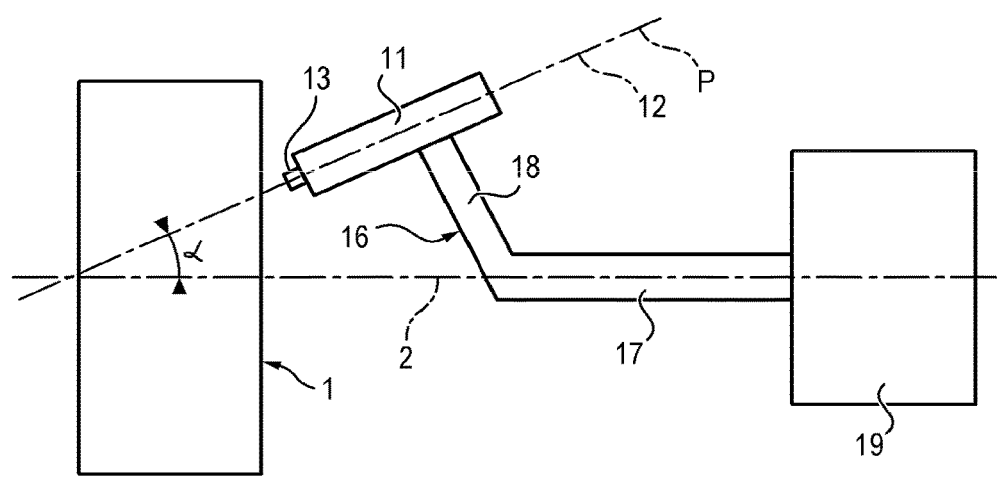
FIG. 2 shows a schematic view from above of the measuring comb and of the combustion chamber illustrated in FIG. 1.

FIGS. 1 and 2 each show schematic view, in profile and bottom, respectively, of a measuring comb 10 according to the first embodiment of the invention in position to measure parameters of the gases flowing at the outlet of a flow path 1 of a turbine engine. In the example illustrated in FIGS. 1 and 2, the flow path 1 is a generally annular combustion chamber having an axis of revolution 2.

Figure 4:
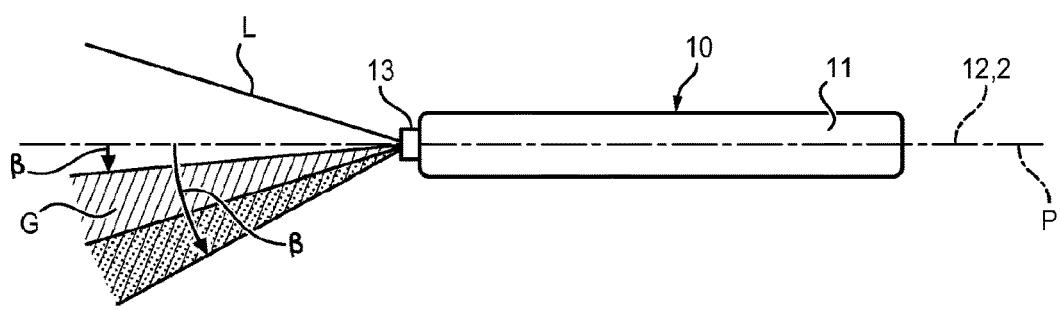
FIG. 4 shows a schematic top view of one orientation of a measuring comb that is not suitable according to the first embodiment of the invention.
Figure 5:
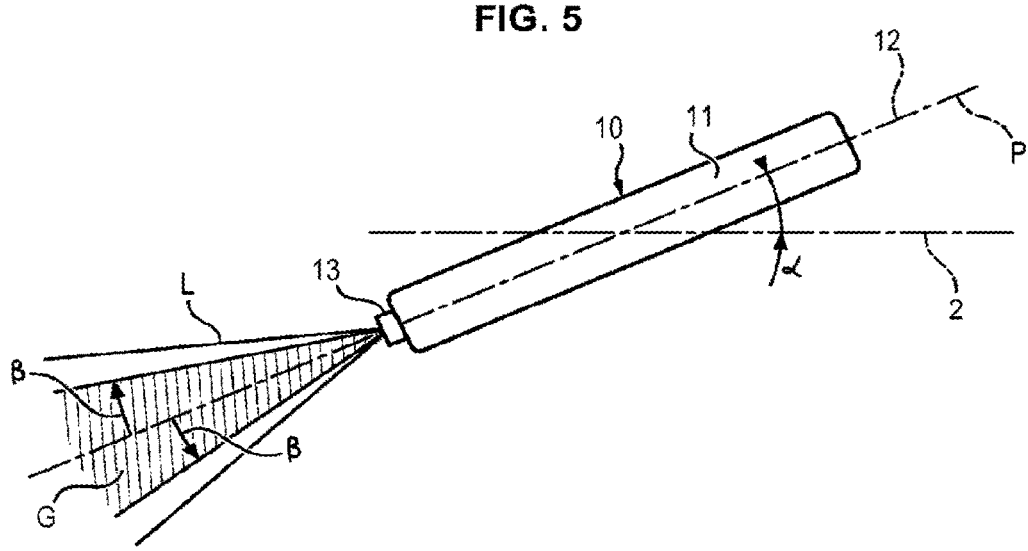
FIG. 5 shows a schematic top view of an orientation of a measurement comb that is suitable according to the first embodiment of the invention.

The gas flow at the outlet of the combustion chamber 1 has a gyration range G defined between the extreme values of gyration corresponding respectively to operation of the combustion chamber 1 under idle and full throttle conditions. The extreme values of gyration correspond to angles β formed between the direction of the gas flow upstream of the measuring comb 10 and the axes 12 of the openings (or the plane P) respectively under idle and full throttle conditions of the turbine engine (FIGS. 4 and 5).

The measuring comb 10 comprises a comb body 11 intended to face the outlet 3 of the combustion chamber 1. One example of comb body 11 is illustrated in FIG. 3.

The comb body 11 has a generally elongated and preferably profiled shape so as not to disturb the flow of gases upstream of the comb body 11, and thus not to falsify the measurements carried out.

The measuring comb 10 further comprises a plurality of measuring openings 13 provided in the comb body 11 and configured to tap the gases flowing at the outlet 3 of the combustion chamber 1. The measuring openings 13 have axes 12 extending in the same plane P.

Figure 3:
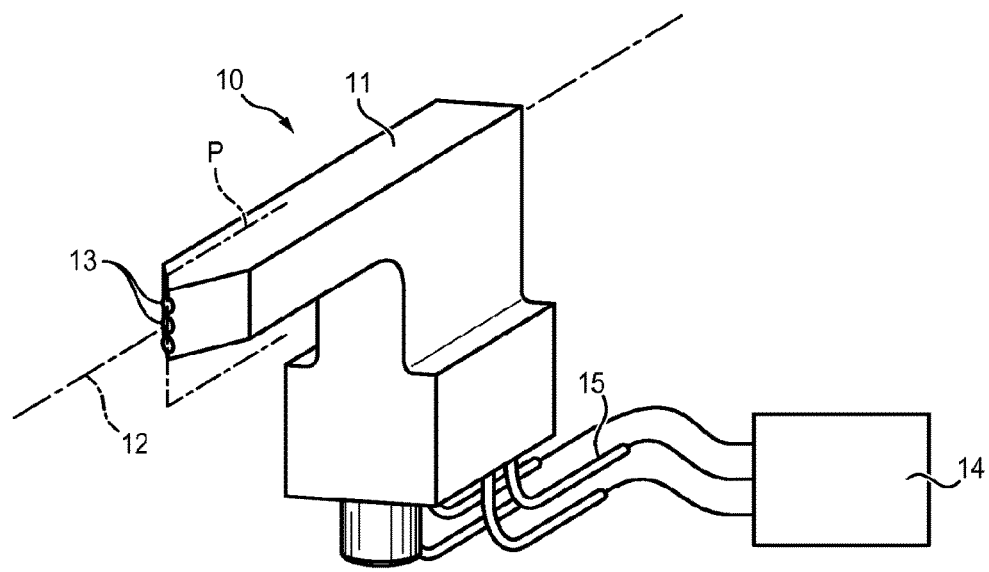
FIG. 3 shows a perspective view of the comb body of a measuring comb according to a first embodiment of the invention.

In the example illustrated in FIG. 3, the axes 12 of the measuring openings 13 are parallel to one another. According to one variant, the axes 12 of the measuring openings 13 extend globally in the shape of a fan. In this variant, the axes 12 of the measuring openings 13 adjacent to the internal and external radii of the wall of the combustion chamber 1 are for example generally parallel to said wall respectively at the internal and external radii.

The measuring openings 13 have a limiting detection range L for the gyration of the gas flow beyond which the measuring openings 13 cannot tape the gases having greater gyration. This limiting detection range L is for example from +/−15 to 20° relative to the axis 12 of each of the measuring openings 13. When the gyration range G of the gas flow at the outlet of the combustion chamber 1 and the limiting detection ranges L overlap as illustrated in FIG. 4, the orientation of the measuring openings 13 is not suitable.

The measuring openings 13 are connected to measuring instruments 14 configured for measuring the temperature and/or the pressure and or the composition of the gases tapped by the measuring openings 13. The measuring instruments 14 can be configured to carry out individual measurements, i.e. per measuring opening 13, or averaged over all the measuring openings 13. The measuring openings 13 are for example connected to measuring instruments 14 by means of channels 15.

The measuring comb 10 further comprises an arm 16 configured to tilt the comb body 11 so that the plane P of the axes 12 of the measuring openings 13 and the axis of revolution 2 form a non-zero angle. Advantageously, the same angle α is retained for testing under idle and full throttle conditions of the combustion chamber 1. More precisely, the angle α is chosen so that the gyration range G of the gas flow at the outlet of the combustion chamber 1 is included within the limiting detection range L as illustrated in FIG. 5. In this configuration, the orientation of the comb body 11 is suitable.

The angle α is preferably comprised between 5 and 15°. In the example illustrated, the angle α is comprised between 8 and 9°.

The measuring comb 10 thus makes it possible to tilt the measuring openings 13 with respect to the axis of revolution 2, so as to take into account the gyratory effect of the gas flow at the outlet of the combustion chamber 1, this both for testing under idle or full throttle conditions in the combustion chamber 1. Thus, it is possible to carry out a series of tests between idle and full throttle of the combustion chamber 1 without modifying the angle α of the measuring openings 13.

In the example illustrated in FIG. 1, the arm 16 comprises a first portion 17 extending along the axis of revolution 2, and a second portion 18 extending generally radially from the first portion 17 and connecting the first portion 17 to the comb body 11.

According to one variant (not shown), the arm 16 includes a ring extending around the axis of revolution 2, to which the comb 11 is clamped.

The arm 16 can be connected to several comb bodies 11 the measuring openings 13 whereof have the same inclination relative to the axis of revolution 2. The arm 16 can for example include several second portions 18 extending radially from the first portion 17, each of the second portions 18 being connected to a comb body 11. According to one variant, several comb bodies 11 can be clamped to the ring. The comb bodies 11 are advantageously distributed equidistantly in a plane generally perpendicular to the axis of revolution 2.

The measuring comb 10 also comprises a motor 19 configured to drive the comb body 11 in rotation around the axis of revolution 2. The motor 19 is for example connected to the first portion 17 of the arm 16 or to the ring to which the comb body 11 is clamped.

Figure 6:
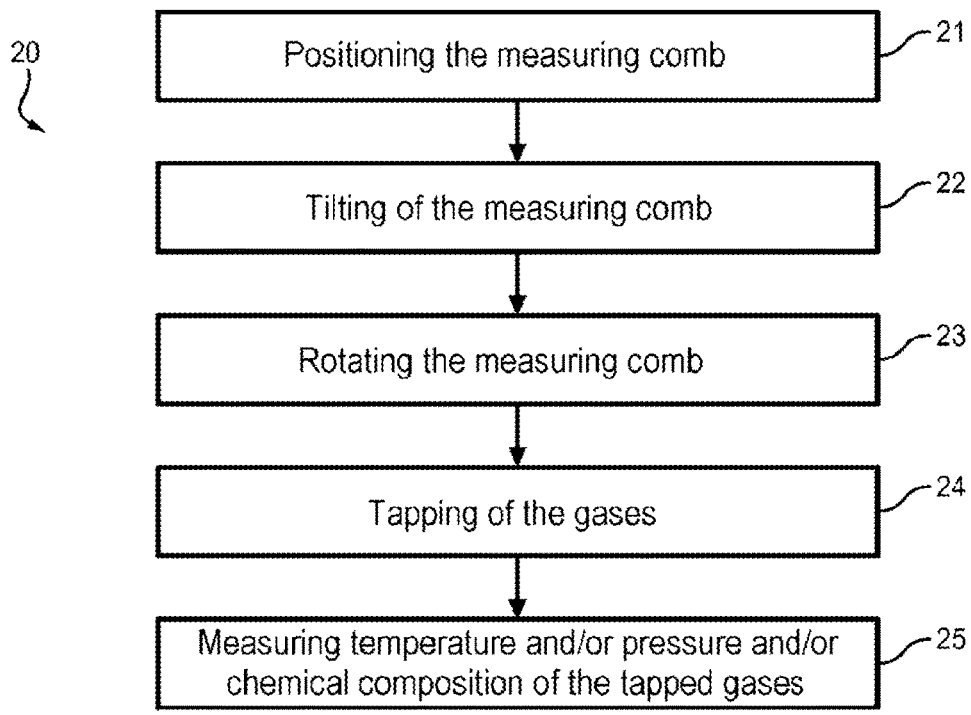
FIG. 6 shows a flowchart representing different steps of an exemplary embodiment of the measurement method according to the first embodiment of the invention.

FIG. 6 is a flow-chart illustrating a method 20 for measuring parameters, for example temperature and/or pressure and/or chemical composition, of the gases flowing at the outlet 3 of the combustion chamber 1. The method 20 comprises steps of:

positioning 21 the comb body 11 facing the outlet 3 of the combustion chamber 1, tilting 22 the comb body 11 at the outlet of the combustion chamber 1 so that the plane P of the axes 12 of the measuring openings 13 and the axis of revolution 2 form the non-zero angle α. Advantageously, the same angle α is retained for testing under idle and full throttle conditions of the combustion chamber 1, rotating 23 the comb body 11 around the axis of revolution 2, tapping 24 of gases flowing at the outlet 3 of the combustion chamber 1 through the measuring openings 13, and measuring 25 parameters, for example temperature and/or pressure and/or chemical composition of the tapped gases.

The angle α is defined so as to be able to accomplish with the same angle α testing under idle and full throttle conditions of the combustion chamber 1. For that purpose, the gyration of the gas flow at the outlet of the combustion chamber 1 is calculated under idle and full throttle conditions of the combustion chamber 1 (angle β) so as to determine that gyration range G of the gas flow at the outlet of the combustion chamber 1, and the angle α is chosen so that the range of gyration G of the gas flow at the outlet of the combustion chamber 1 is included in the limiting detection range of the measuring openings 13.

The method 20 thus makes it possible to tilt the measuring openings 13 with respect to the axis of revolution 2, so as to take into account the gyratory effect of the gas flow at the outlet 3 of the combustion chamber 1, this both for idle or full throttle operating conditions of the combustion chamber 1. Thus it is possible to carry out a series of tests between idle and full throttle of the combustion chamber 1 without modifying the angle α of the measuring openings 13.

Second Embodiment of the Invention

Figure 7:
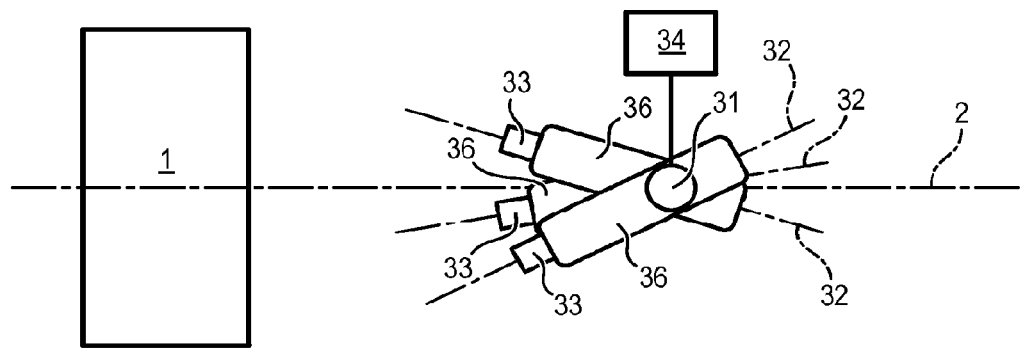
FIG. 7 shows a schematic view of a measuring comb according to a second embodiment of the invention in position for measuring the parameters of the gas flowing at the outlet of a turbine engine flow path.
Figure 8:
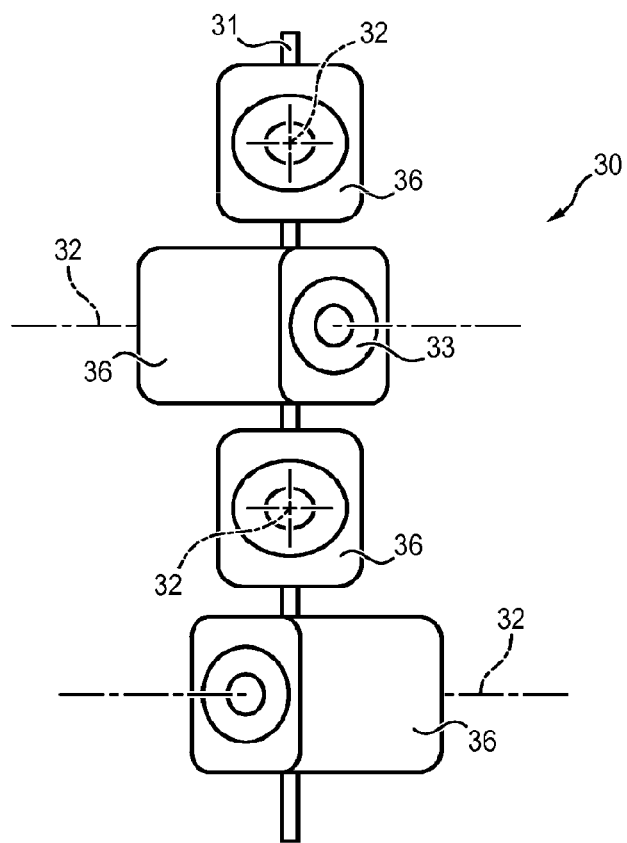
FIG. 8 shows a schematic view of a first example of measuring comb body according to the second embodiment of the invention.
Figure 9:
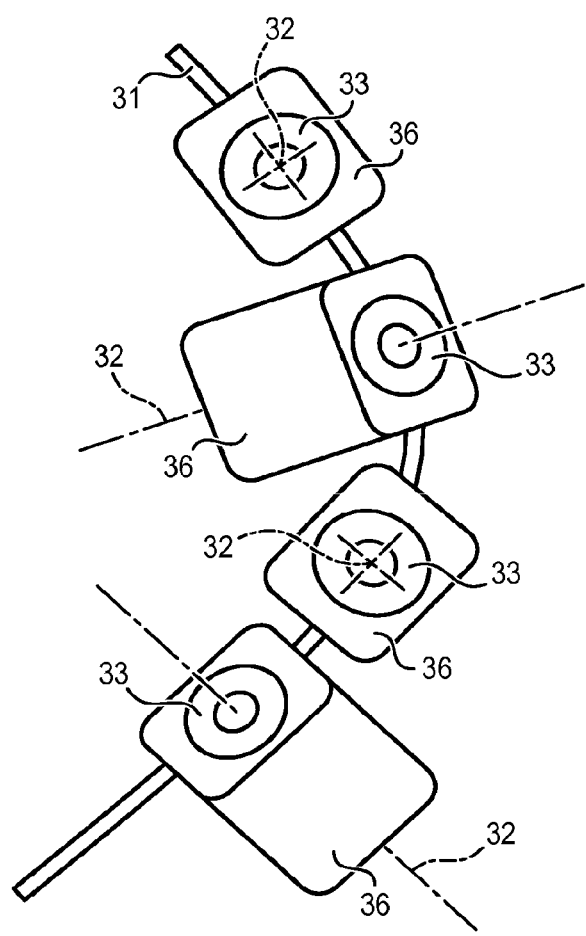
FIG. 9 shows a schematic view of a second example of measuring comb body according to the second embodiment of the invention.

FIGS. 7 to 9 each show an example of a measuring comb 30 according to the second embodiment of the invention.

In these examples, the comb body 31 is a rod forming a rotation line around which the measuring opening(s) 33 are capable of pivoting. The rod 31 is equipped with a plurality of these modules 36 each accommodating a measuring opening 33, each of the modules 36 being configured to pivot around the rod 31 independently from each other.

In this manner, the axes 32 of the measuring openings 33 can have a different tilt from one another relative to the axis of revolution 2 of the flow path 1. It is therefore possible to adapt the orientation of the measuring openings 33 depending on the direction of flow of the gases at their position at the outlet of the flow path 1.

The rod 31 can for example be threaded, over its entire length or by segments, and the modules 36 can each be provided with a tapped bore complementary with the threading of the rod 31, so as to allow pivoting of the modules 36 around the rotation line.

The modules 36 can be advantageously separated from one another by spacers (not shown) so as to maintain the modules 36 at a fixed distance from one another.

Each measuring comb 30 is for example connected to a ring (not shown) extending around the axis of revolution 2 of the flow path 1. For that purpose, an Atlas hose clamp or a cone tip set screw can be used to connect each of the measuring combs 30 to the ring.

In the example illustrated in FIG. 7, the rotation line formed by the rod 31 is rectilinear. In the variant illustrated in FIG. 8, the rotation line formed by the rod 31 is curved.

The measuring combs 10, 30 proposed have the advantage of being equipped with control means 16, 36 allowing orientation of the measuring openings 13, 33 in the flow direction of the gases at the outlet of the flow path 1, therefore taking into account the three-dimensional effects of the gas flow so as to tap a greater quantity of gas and accomplish better quality measurements.

The invention claimed is:

1. A measuring comb for measuring at least one of temperature, pressure, or chemical composition of gases flowing at an outlet of a turbine engine flow path, said flow path extending around an axis of revolution of the flow path, said measuring comb comprising:
    a comb body with an elongated shape, facing the outlet of the flow path, said comb body comprising at least one measuring opening arranged along an axis, the at least one measuring opening being configured to tap gases flowing at the outlet of the flow path; and
    adjusting means configured to adjust an angle between the axis of the at least one measuring opening and the axis of revolution, so as to allow orientation of the at least one measuring opening in a flow direction of the gases at the outlet of the flow path,
    wherein the comb body is a rod forming a rotation line around which the at least one measuring opening is capable of pivoting, and
    wherein the rod is equipped with a plurality of modules each accommodating a measuring opening, the modules being configured to pivot around the rod independently from each other.

2. The measuring comb according to claim 1, wherein the rotation line formed by the rod is rectilinear.

3. The measuring comb according to claim 1, wherein the rotation line formed by the rod is curved.

4. The measuring comb according to claim 1, wherein the at least one measuring opening is connected to a measuring instrument configured for measuring at least one of temperature, pressure, or chemical composition of the gases tapped by the at least one measuring opening.

5. A measuring comb for measuring at least one of temperature, pressure, or chemical composition of gases flowing at an outlet of a turbine engine flow path, said flow path extending around an axis of revolution of the flow path, said measuring comb comprising:
    a comb body with an elongated shape, facing the outlet of the flow path, said comb body comprising a plurality of measuring openings each arranged along an axis, the plurality of measuring openings being configured to tap gases flowing at the outlet of the flow path;
    adjusting means configured to adjust an angle between the axis of each of the plurality of measuring openings and the axis of revolution, so as to allow orientation of the plurality of measuring openings in a flow direction of the gases at the outlet of the flow path; and
    an arm configured to adjust a tilt of the comb body at the outlet of the flow path with respect to the axis of revolution of the flow path,
    wherein the axes of the plurality of measuring openings extend in a same plane, the arm being configured to adjust the tilt of the comb body at the outlet of the flow path with respect to the axis of revolution of the flow path so that the plane of the axes of the plurality of measuring openings and the axis of revolution form a non-zero angle comprised between 5° and 15°, said arm comprising a first portion extending along the axis of revolution and a second portion extending generally radially from the first portion and connecting the first portion to the comb body.

6. The measuring comb according to claim 5, wherein the axes of the measuring openings extend generally in the shape of a fan.

* * * * *

UNITED STATES PATENT AND TRADEMARK OFFICE
CERTIFICATE OF CORRECTION

Page 1 of 1

PATENT NO. : 10,190,946 B2
APPLICATION NO. : 15/314043
DATED : January 29, 2019
INVENTOR(S) : Romain Nicolas Lunel et al.

It is certified that error appears in the above-identified patent and that said Letters Patent is hereby corrected as shown below:

On the Title Page

Item (73) Assignee:
Change "SAFRAN AIRCRAFTS ENGINES"
To --SAFRAN AIRCRAFT ENGINES--.

Signed and Sealed this
Thirty-first Day of March, 2020

Andrei Iancu
*Director of the United States Patent and Trademark Office*